(12) United States Patent
Ejzak et al.

(10) Patent No.: US 7,499,403 B2
(45) Date of Patent: Mar. 3, 2009

(54) CONTROL COMPONENT REMOVAL OF ONE OR MORE ENCODED FRAMES FROM ISOCHRONOUS TELECOMMUNICATION STREAM BASED ON ONE OR MORE CODE RATES OF THE ONE OR MORE ENCODED FRAMES TO CREATE NON-ISOCHRONOUS TELECOMMUNICATIONS STREAM

(75) Inventors: Richard Paul Ejzak, Wheaton, IL (US); Peter James McCann, Naperville, IL (US); Michael D. Turner, Madison, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 1090 days.

(21) Appl. No.: 10/430,978

(22) Filed: May 7, 2003

(65) Prior Publication Data

US 2004/0223487 A1   Nov. 11, 2004

(51) Int. Cl.
*G06F 11/00* (2006.01)
*G10L 19/00* (2006.01)

(52) U.S. Cl. .................................. 370/236; 704/221

(58) Field of Classification Search ................. None
See application file for complete search history.

(56) References Cited

U.S. PATENT DOCUMENTS

| 5,761,430 | A | * | 6/1998 | Gross et al. ................. 709/225 |
| 6,127,953 | A | * | 10/2000 | Manzardo ..................... 341/87 |
| 7,080,009 | B2 | * | 7/2006 | Proctor et al. ............... 704/221 |
| 2002/0054586 | A1 | | 5/2002 | Hoffmann | |
| 2003/0231594 | A1 | * | 12/2003 | Xu et al. ..................... 370/236 |

FOREIGN PATENT DOCUMENTS

EP    0 596 645    5/1994

* cited by examiner

*Primary Examiner*—Firmin Backer
*Assistant Examiner*—Clemence Han

(57) ABSTRACT

An isochronous telecommunication stream comprises a plurality of frames encoded by a variable rate isochronous coder-decoder (codec) at a plurality of code rates of multiple available code rates. A control component removes one or more encoded frames from the plurality of frames of the isochronous telecommunication stream based on one or more code rates of the one or more encoded frames to create a non-isochronous telecommunication stream.

23 Claims, 5 Drawing Sheets

CONTROL COMPONENT REMOVAL OF ONE OR MORE ENCODED FRAMES FROM ISOCHRONOUS TELECOMMUNICATION STREAM BASED ON ONE OR MORE CODE RATES OF THE ONE OR MORE ENCODED FRAMES TO CREATE NON-ISOCHRONOUS TELECOMMUNICATIONS STREAM

TECHNICAL FIELD

The invention relates generally to communications and more particularly to wireless communications.

BACKGROUND

A first isochronous coder-decoder ("codec") generates a stream of frames in a periodic sequence. The first isochronous coder-decoder in one example sends the stream to a second isochronous coder-decoder. The second isochronous coder-decoder expects the stream of frames to be in the periodic sequence. For example, isochronous code division multiple access ("CDMA") codecs produce a stream that comprises a voice frame every 20 milliseconds. Isochronous code division multiple access codecs produce frames of various sizes/rates for transmission on the code division multiple access air interface. The sizes/rates of the frames in one example comprise full rate, half rate, quarter rate, and eighth rate. For example, the eighth rate frames are the smallest frames produced by the isochronous code division multiple access codec. The isochronous code division multiple access codecs use the eighth rate frames to transmit low volume audio signals, for example background noise in a voice conversation. Exemplary isochronous code division multiple access codecs comprise enhanced variable rate codec ("EVRC"), 13-kilobit version ("13 k"), and selectable mode vocoder ("SMV").

A real time protocol, user datagram protocol, and internet protocol stack ("RTP/UDP/IP") is a transport protocol stack for packet media. Each frame transported via RTP/UDP/IP comprises a data portion and a header portion. The RTP/UDP/IP header portion is a substantial amount of information. Therefore, even a frame with a very small data portion has a substantial amount of information to transmit. For example, an eighth rate frame transmitting only background noise over RTP/UDP/IP requires a header portion of the frame with a substantial amount of information.

As one shortcoming, the near constant transmission of frames with a substantial amount of information between isochronous codecs diminishes the transport efficiency of the air interface and backbone network. During a voice call there will be times when at least one of the isochronous codecs involved in the voice call will generate a frame corresponding to silence. The silence can be represented with a relatively small amount of information in the data portion. However, the RTP/UDP/IP header portion added to the data portion makes the total size of the frame large and thus, taxing to the resources of the air interface and backbone network.

Thus, a need exists to increase a transport efficiency of isochronous codec data transmissions.

SUMMARY

The invention in one embodiment encompasses an apparatus. An isochronous telecommunication stream comprises a plurality of frames encoded by a variable rate isochronous coder-decoder (codec) at a plurality of code rates of multiple available code rates. A control component removes one or more encoded frames from the plurality of frames of the isochronous telecommunication stream based on one or more code rates of the one or more encoded frames to create a non-isochronous telecommunication stream.

Another embodiment of the invention encompasses a method. An isochronous telecommunication stream comprises a plurality of frames encoded by a variable rate isochronous coder-decoder at a plurality of code rates of a multiple of available code rates. One or more encoded frames are removed from the plurality of frames of the isochronous telecommunication stream based on one or more code rates of the one or more encoded frames to create a non-isochronous telecommunication stream.

A further embodiment of the invention encompasses an article. The article comprises one or more computer-readable signal-bearing media. An isochronous telecommunication stream comprises a plurality of frames encoded by a variable rate isochronous coder-decoder at a plurality of code rates of a multiple of available code rates. The article comprises means in the one or more media for removing one or more encoded frames from the plurality of frames of the isochronous telecommunication stream based on one or more code rates of the one or more encoded frames to create a non-isochronous telecommunication stream.

DESCRIPTION OF THE DRAWINGS

Features of exemplary implementations of the invention will become apparent from the description, the claims, and the accompanying drawings in which:

DETAILED DESCRIPTION

Figure 1:
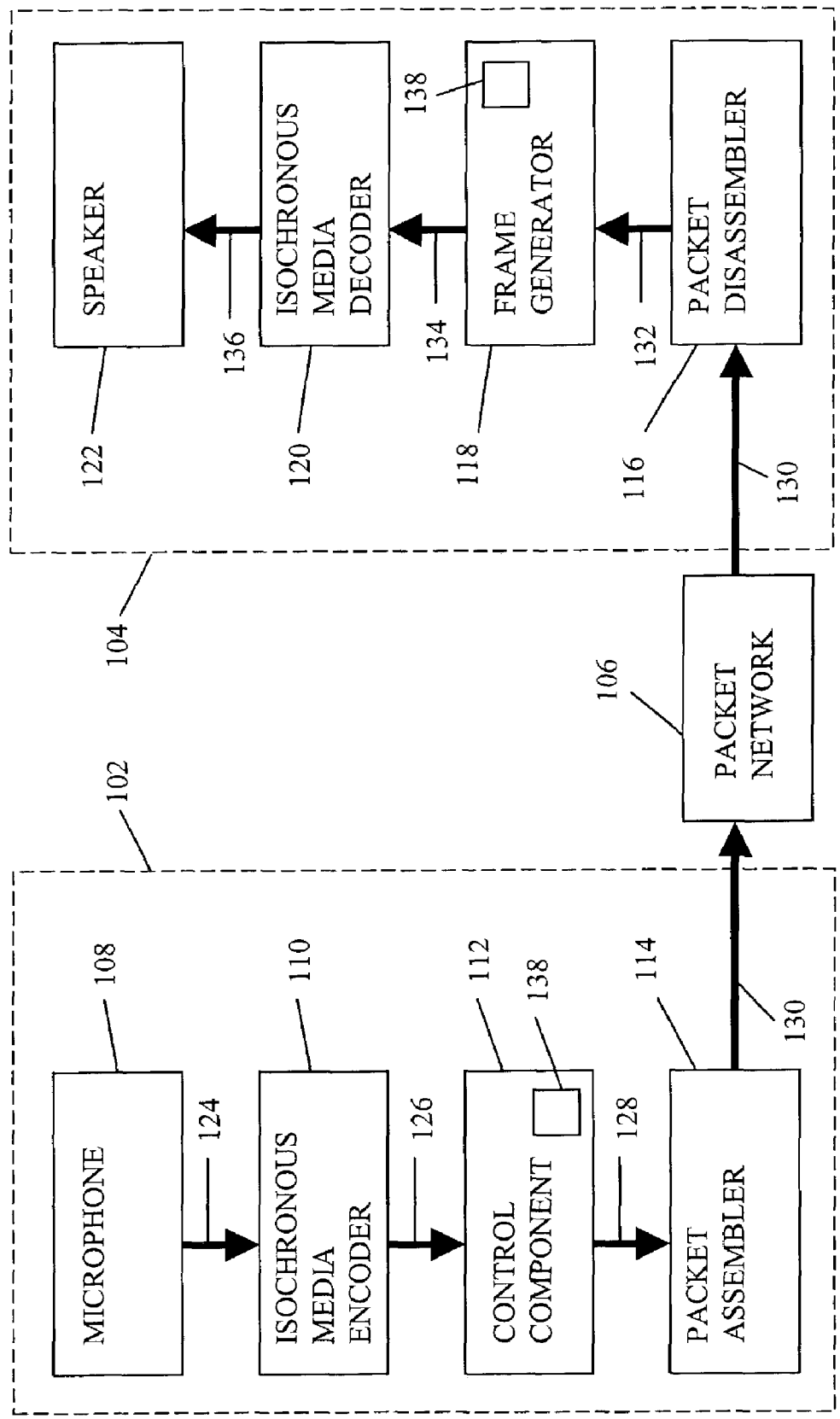
FIG. 1 is a representation of an exemplary implementation of an apparatus that comprises one or more packet telephony components and one or more packet networks.

Turning to FIG. 1, an apparatus 100 in one example comprises a plurality of components such as computer software and/or hardware components. A number of such components can be combined or divided in the apparatus 100. An exemplary component of the apparatus 100 employs and/or comprises a set and/or series of computer instructions written in or implemented with any of a number of programming languages, as will be appreciated by those skilled in the art.

The apparatus 100 in one example comprises one or more packet telephony components 102 and 104, and one or more packet networks 106. The apparatus 100 in one example comprises a portion of a cellular communication path. The cellular communication path in one example comprises a code division multiple access ("CDMA") cellular communication path. The packet telephony components 102 and 104 in one example serve to allow a user (not shown) of the packet telephony component 102 to send a voice stream to a user (not shown) of the packet telephony component 104. For example, the packet telephony component 102 sends the voice stream through a portion of a cellular communication path provided by the packet network 106 to the user of the packet telephony component 104.

The packet telephony component 102 in one example comprises a microphone 108, an isochronous media encoder 110, a control component 112, and a packet assembler 114. The packet telephony component 104 in one example comprises a packet disassembler 116, a frame generator 118, an isochronous media decoder 120, and a speaker 122. The microphone 114 serves to convert the voice of the user of the packet telephony component 104 into a first data stream 124.

The isochronous media encoder 110 comprises a variable rate voice coder-decoder ("codec"), for example, a code division multiple access codec. Exemplary variable rate voice codecs comprise enhanced variable rate codec ("EVRC"), 13-kilobit version ("13 k"), and selectable mode vocoder ("SMV"). The isochronous media encoder 110 in one example encodes data at a plurality of code rates, for example, an eighth rate code rate, a quarter rate code rate, a half rate code rate, and a full rate code rate. The isochronous media encoder 110 employs the plurality of code rates to convert the first data stream 124 into a first isochronous telecommunication stream of encoded frames 126, as will be understood by those skilled in the art.

The control component 112 in one example comprises a first frame processor 506 (FIG. 5) and a second frame processor 508 (FIG. 5), as described herein. The control component 112 in one example comprises an instance of a recordable data storage medium 138, as described herein. The control component 112 in one example serves to remove one or more encoded frames from the first isochronous telecommunication stream of encoded frames 126 to create a first non-isochronous telecommunication stream of encoded frames 128. The packet assembler 114 in one example serves to create a stream of network packets 130 from the first non-isochronous telecommunication stream of encoded frames 128 for transmission via the packet network 106 to the packet disassembler 116, as described herein.

The packet disassembler 116 in one example serves to receive the stream of network packets 130 from the packet assembler 114 via the packet network 106. The packet disassembler 116 in a further example serves to convert the stream of network packets 130 into a second non-isochronous telecommunication stream of encoded frames 132. The frame generator 118 in one example comprises an instance of a recordable data storage medium 138, as described herein. The frame generator 118 serves to add one or more encoded frames to the second non-isochronous telecommunication stream of encoded frames 132 to create a second isochronous telecommunication stream of encoded frames 134, as described herein.

The isochronous media decoder 120 comprises a variable rate voice coder-decoder, for example, a code division multiple access codec. The isochronous media decoder 120 in one example decodes data of a plurality of code rates, for example, the eighth rate code rate, the quarter rate code rate, the half rate code rate, and the full rate code rate. The isochronous media decoder 120 employs the plurality of code rates to convert the second isochronous telecommunication stream of encoded frames 134 into a second data stream 136, as will be understood by those skilled in the art. The speaker 128 in one example serves to convert the second data stream 136 from the isochronous media decoder 120 into an audio signal. The speaker 128 plays the audio signal to the user of the packet telephony component 104, as described herein.

The packet network 106 in one example comprises an internet protocol ("IP") network, an asynchronous transfer mode ("ATM") network, or a cellular communication network. The packet network 106 in a further example comprises a non-isochronous network. The packet network 106 in one example employs a real-time protocol/user datagram protocol/internet protocol ("RTP/UDP/IP") stack to transmit network packets. In another example, the packet network 106 employs an asynchronous transfer mode adaptation layer 2 protocol ("AAL2"). The packet network 106 serves to provide a communication path for transmission of the stream of network packets 130 from the packet assembler 114 to the packet disassembler 116.

Exemplary packet telephony components 102 and 104 comprise various configurations of one or more mobile cellular communication devices 202 (FIG. 2) and 204 (FIG. 2), one or more media gateways 206 (FIG. 2) and 208 (FIG. 2), one or more landline communication devices, one or more network infrastructure devices, and other telephony components, as will be understood by those skilled in the art. Exemplary landline communication devices comprise a public switched telephone network 302 (FIG. 3), a cable modem telephony device, and a digital subscriber line telephony device. Exemplary network infrastructure devices comprise the media gateways 206 (FIG. 2) and 208 (FIG. 2), a base station, a radio network controller, a packet data serving node, and a general packet radio service gateway support node.

Figure 2:
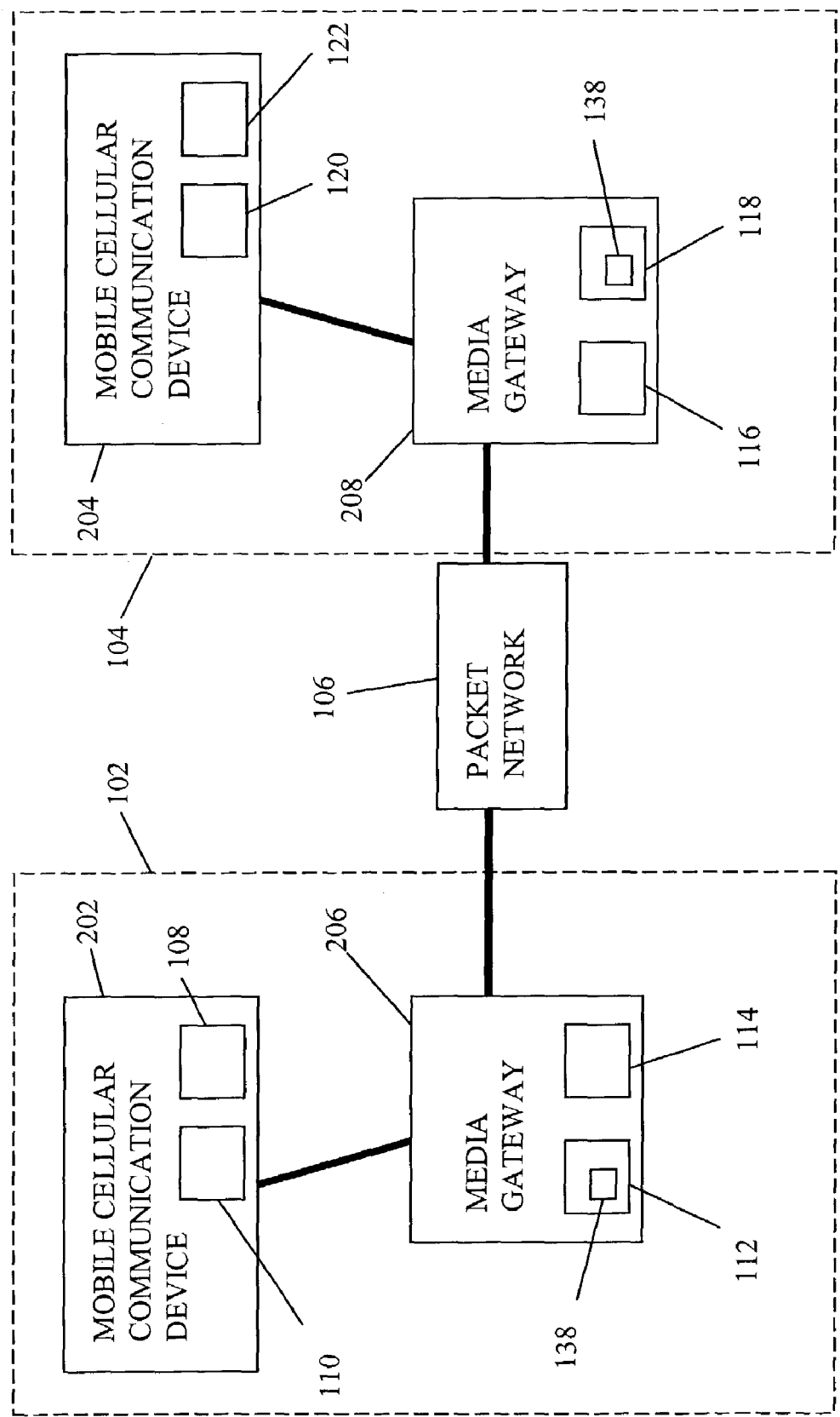
FIG. 2 is a representation of one exemplary implementation of the apparatus of FIG. 1.

In one example, the packet telephony component 102 or 104 comprises the mobile cellular communication device 202 (FIG. 2). In another example, the packet telephony component 102 or 104 comprises the mobile cellular communication device 202 (FIG. 2) and the media gateway 206 (FIG. 2). In yet another example, the packet telephony component 102 or 104 comprises the public switched telephone network 302 (FIG. 3) and the media gateway 208 (FIG. 2). In another example, the packet telephony component 102 or 104 comprises a digital subscriber line telephony device.

Figure 3:
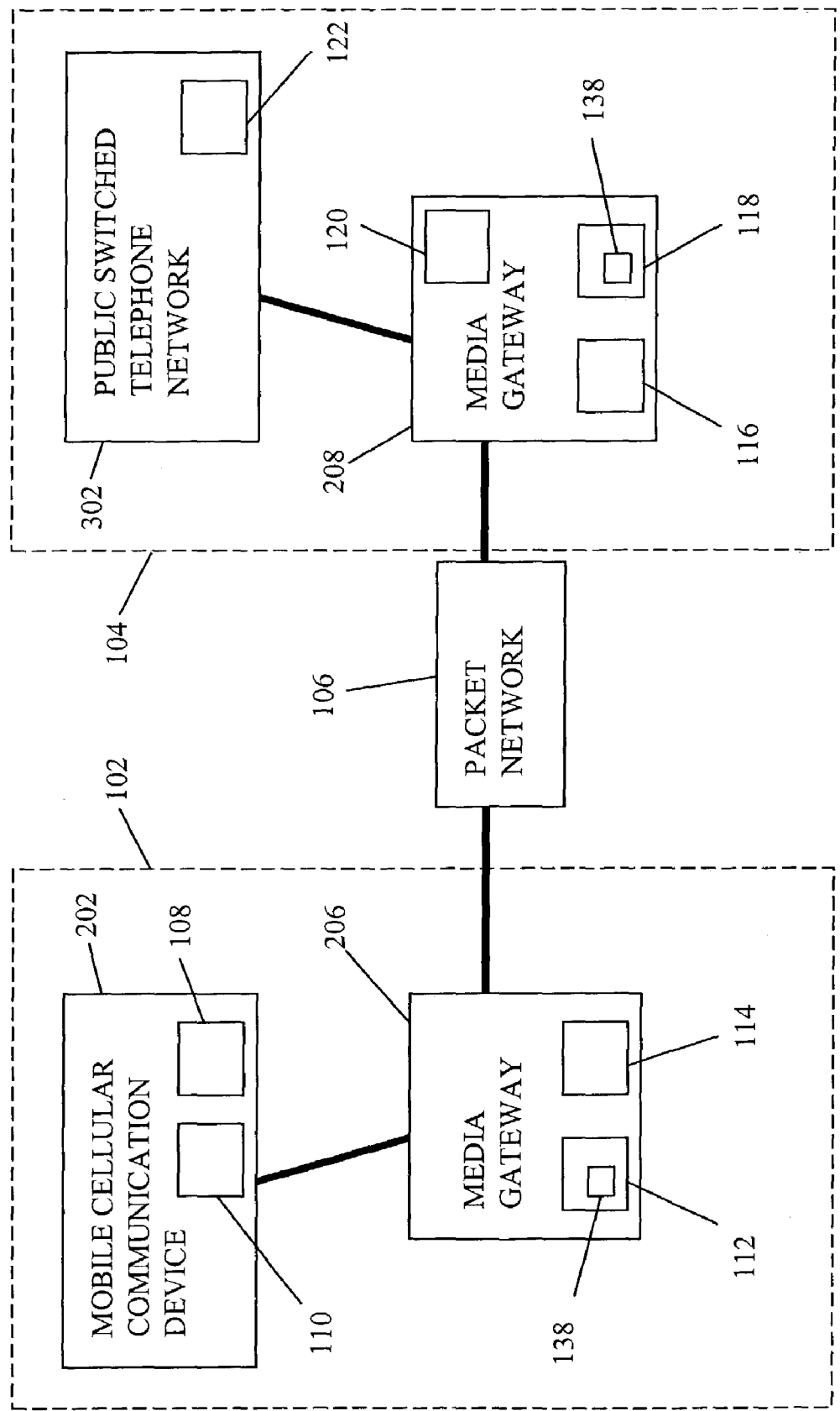
FIG. 3 is a representation of another exemplary implementation of the apparatus of FIG. 1.

In one example, the packet telephony component 102 comprises the mobile cellular communication device 202 (FIG. 2) and the packet telephony component 104 comprises the mobile cellular communication device 204 (FIG. 2). For example, the user of the mobile cellular communication device 202 (FIG. 2) sends a voice stream to the user of the mobile cellular communication device 204 (FIG. 2). In another example, the packet telephony component 102 comprises the mobile cellular communication device 202 (FIG. 2) and the media gateway 206 (FIG. 2), and the packet telephony component 104 comprises the media gateway 208 (FIG. 2) and the public switched telephone network 302 (FIG. 3). For example, the user of the mobile cellular communication device 202 (FIG. 2) sends a voice stream to the user of the public switched telephone network 302 (FIG. 3). In yet another example, the packet telephony component 102 comprises a digital subscriber line telephony device and the packet telephony component 104 comprises the media gateway 208 (FIG. 2) and the mobile cellular communication device 204 (FIG. 2). For example, a user of the digital subscriber line telephony device sends a voice stream to a user of the mobile cellular communication device 204 (FIG. 2).

An illustrative description of exemplary operation of the apparatus 100 is presented, for explanatory purposes. The user of the packet telephony component 102 in one example speaks into the microphone 108 during a call to the user of the packet telephony component 104. The microphone 108 in one example converts the voice of the user of the packet telephony component 104 into the first data stream 124.

The isochronous media encoder 110 in one example converts the first data stream 124 into the first isochronous telecommunication stream of encoded frames 126. For example, the isochronous media encoder 110 samples the first data stream 124 over constant time intervals and creates respective encoded frames. The first isochronous telecommunication stream of encoded frames 126 in one example comprises one encoded frame per constant time interval, for example, an encoded frame is created every 20 milliseconds. The isochronous media encoder 110 in one example employs any one of the plurality of code rates of the isochronous media encoder 110 to create the respective encoded frames. For example, if a constant time interval of the first data stream 124 comprises relatively little voice content, the isochronous media encoder 110 employs a lower frame rate to create the respective encoded frame.

The first isochronous telecommunication stream of encoded frames 126 in one example represents the voice stream of the user of the packet telephony component 104. In one example, the isochronous media encoder 110 creates an encoded frame with a lowest code rate (e.g., the eighth rate code rate) to represent a pause in speaking over a constant time interval. In another example, the isochronous media encoder 110 creates an encoded frame with a highest code rate (e.g., the full code rate) to represent the user actively speaking over a constant time interval. Frames encoded with the lowest code rate of the first isochronous telecommunication stream of encoded frames 126 in one example can be replaced with alternate frames encoded with the lowest code rate without significantly altering the voice stream represented by the first isochronous telecommunication stream of encoded frames 126, as described herein. The encoded frames are referred to by their respective code rate, for example, an eighth rate frame or a full rate frame, as will be understood by those skilled in the art.

The control component 112 in one example removes one or more encoded frames from the first isochronous telecommunication stream of encoded frames 126 to create a first non-isochronous telecommunication stream of encoded frames 128. In one example, the control component 112 removes one or more encoded frames with the lowest code rate (e.g., the eighth rate frames) from the first isochronous telecommunication stream of encoded frames 126. In another example, the control component 112 removes one or more encoded frames with any of a plurality of code rates (e.g., the eighth rate frames and the quarter rate frames) from the first isochronous telecommunication stream of encoded frames 126. In yet another example, the control component 112 removes only a portion of one or more encoded frames with the lowest code rate from the first isochronous telecommunication stream of encoded frames 126. The control component 112 in one example removes the one or more encoded frames from the first isochronous telecommunication stream of encoded frames 126 to increase a transport efficiency of the first isochronous telecommunication stream of encoded frames 126.

The first isochronous telecommunication stream of encoded frames 126 in one example comprises one or more contiguous sets of lowest rate frames. One or more lowest rate frames of the one or more contiguous sets of lowest rate frames in one example comprise one or more low information content reference frames. For example, the low information content reference frames represent low volume noise. In one example, the low information content reference frame comprises an encoded frame that follows an encoded frame that is not a lowest rate frame. For example, the low information content reference frame designates a start of a removed set of lowest rate frames. In another example, the low information content reference frame comprises an encoded frame that follows one or more lowest rate frames. For example, the low information content reference frame designates a continuation of a removed set of lowest rate frames.

The packet assembler 114 in one example converts the first non-isochronous telecommunication stream of encoded frames 128 into the stream of network packets 130. For example, the packet assembler 114 employs the real-time protocol/user datagram protocol/internet protocol stack to create the stream of network packets 130. The packet assembler 114 in one example sends the stream of network packets 130 via the packet network 106 to the packet disassembler 116.

The packet disassembler 116 in one example converts the stream of network packets 130 into a second non-isochronous telecommunication stream of encoded frames 132. In a further example, the packet disassembler 116 buffers and resynchronizes the network packets of the stream of network packets 130 to compensate for arrival time jitter associated with the packet network 106. The first non-isochronous telecommunication stream of encoded frames 128 and the second non-isochronous telecommunication stream of encoded frames 132 in one example comprise non-isochronous telecommunication streams of encoded frames that are substantially similar, as will be understood by those skilled in the art.

The frame generator 118 in one example adds one or more generated frames to the second non-isochronous telecommunication stream of encoded frames 132 to create a second isochronous telecommunication stream of encoded frames 134. The generated frames in one example are based on one or more previously received encoded frames. In one example, the generated frames comprise copies of previously received encoded frames. In another example, the generated frames comprise a default encoded frame. The second isochronous telecommunication stream of encoded frames 134 in one example comprises an encoded frame per constant time interval. For example, the first isochronous telecommunication stream of encoded frames 126 and the second isochronous telecommunication stream of encoded frames 134 comprise a same constant time interval. If an encoded frame of the second non-isochronous telecommunication stream of encoded frames 132 does not exist for a constant time interval, then the frame generator 118 adds a generated frame for the constant time interval to create the second isochronous telecommunication stream of encoded frames 134.

The frame generator 118 in one example adds a generated frame if the previous encoded frame of the second non-isochronous telecommunication stream of encoded frames 132 comprises a low information content reference frame. In one example, the generated frame comprises a lowest rate frame, for example, an eighth rate frame. In a further example, the generated frame comprises the previous encoded frame of the second non-isochronous telecommunication stream of encoded frames 132, for example, the low information content reference frame. The frame generator 118 in one example replaces the one or more encoded frames removed by the control component 112 with one or more low information content reference frames.

The isochronous media decoder 120 in one example converts the second isochronous telecommunication stream of encoded frames 134 into a second data stream 136. The first data stream 124 and the second data stream 136 in one example comprise data streams that are substantially similar. For example, a first decoded audio stream of the first isochronous telecommunication stream 126 is substantially similar to a second decoded audio stream of the second isochronous telecommunication stream 134. The speaker 122 in one example converts the second data stream 136 into an audio signal for the user of the packet telephony component 104, as will be understood by those skilled in the art.

Turning to FIG. 2, the packet telephony component 102 in one example comprises the mobile cellular communication device 202 and the media gateway 206. The packet telephony component 104 in one example comprises the mobile cellular communication device 204 and the media gateway 208. The mobile cellular communication devices 202 and 204 in one example comprise a cellular phone and/or a personal digital assistant ("PDA"). In a further example, one or more of the mobile cellular communication devices 202 and 204 are compatible with a code division multiple access ("CDMA") cellular network. The mobile cellular communication device 202 in one example comprises the microphone 108 and the isochronous media encoder 110. The mobile cellular communication device 204 in one example comprises the isochronous media decoder 120 and the speaker 122.

The media gateways 206 and 208 in one example comprise media gateways of an internet protocol multimedia subsystem ("IMS"). The media gateway 206 in one example comprises the control component 112 and the packet assembler 114. The media gateway 208 in one example comprises the packet disassembler 116 and the frame generator 118.

Turning to FIG. 3, the packet telephony component 102 in one example comprises the mobile cellular communication device 202 and the media gateway 206. The packet telephony component 104 in one example comprises the media gateway 208 and a portion of a public switched telephone network ("PSTN") 302. The mobile cellular communication device 204 in one example serves to allow the user of the mobile cellular communication device 204 to send a voice stream to the user of the public switched telephone network 302. The media gateway 208 in one example comprises the packet disassembler 116, the frame generator 118, and the isochronous media decoder 120. The public switched telephone network 302 in one example comprises the speaker 122. The speaker 122 plays the audio signal to the user of the public switched telephone network 302.

Figure 4:
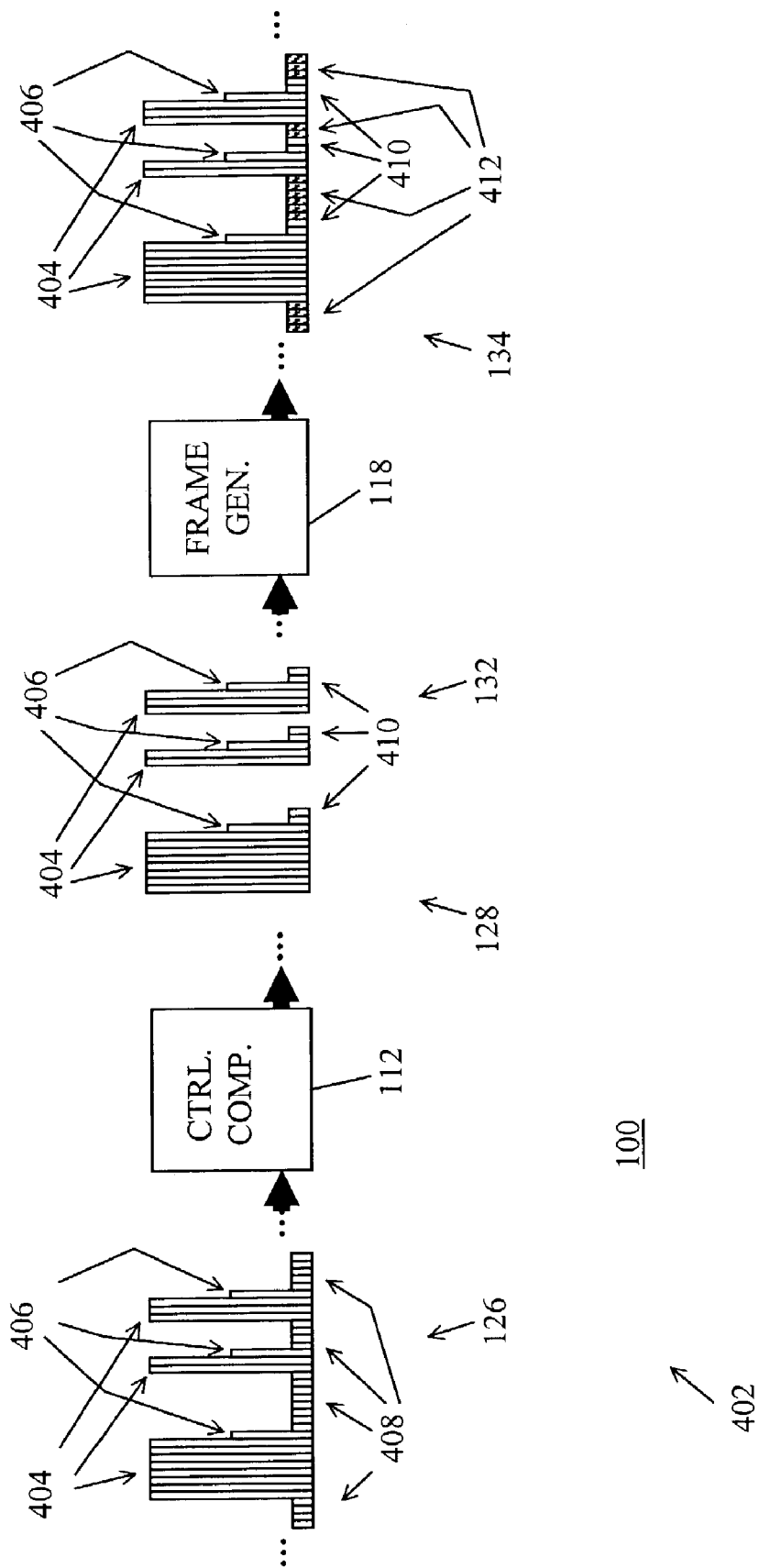
FIG. 4 is a representation of an exemplary data flow between the packet telephony components of FIG. 1.

Turning to FIG. 4, a data flow 402 during a call through the control component 112 and the frame generator 118 comprises the first isochronous telecommunication stream of encoded frames 126, the non-isochronous telecommunication streams of encoded frames 128 and 132, and the second isochronous telecommunication stream of encoded frames 134. The first isochronous telecommunication stream of encoded frames 126 in one example comprises one or more full rate frames 404, one or more half rate frames 406, and one or more eighth rate frames 408. The eighth rate frames 408 in one example comprise one or more low information content reference frames 410. The first non-isochronous telecommunication stream of encoded frames 128 comprises the full rate frames 404, the half rate frames 406, and the low information content reference frames 410. The control component 112 in one example removes one or more of the contiguous eighth rate frames 408 that follow the one or more low information content reference frames 410 to create the first non-isochronous telecommunication stream of encoded frames 128 to reduce a quantity of data to transmit and promote an increase in transmission efficiency. The first non-isochronous telecommunication stream of data 128 and the second non-isochronous telecommunication stream of data 132 in one example comprise non-isochronous telecommunication streams of data that are substantially similar.

The frame generator 118 adds one or more generated frames 412 to the second non-isochronous telecommunication stream 132 to create the second isochronous telecommunication stream of encoded frames 134. The first isochronous telecommunication stream of encoded frames 126 in one example is substantially similar to the second isochronous telecommunication stream of encoded frames 134. In one example, the generated frames 412 comprise eighth rate frames. In another example, the generated frames 412 comprise one or more copies of the low information content reference frames 410.

Figure 5:
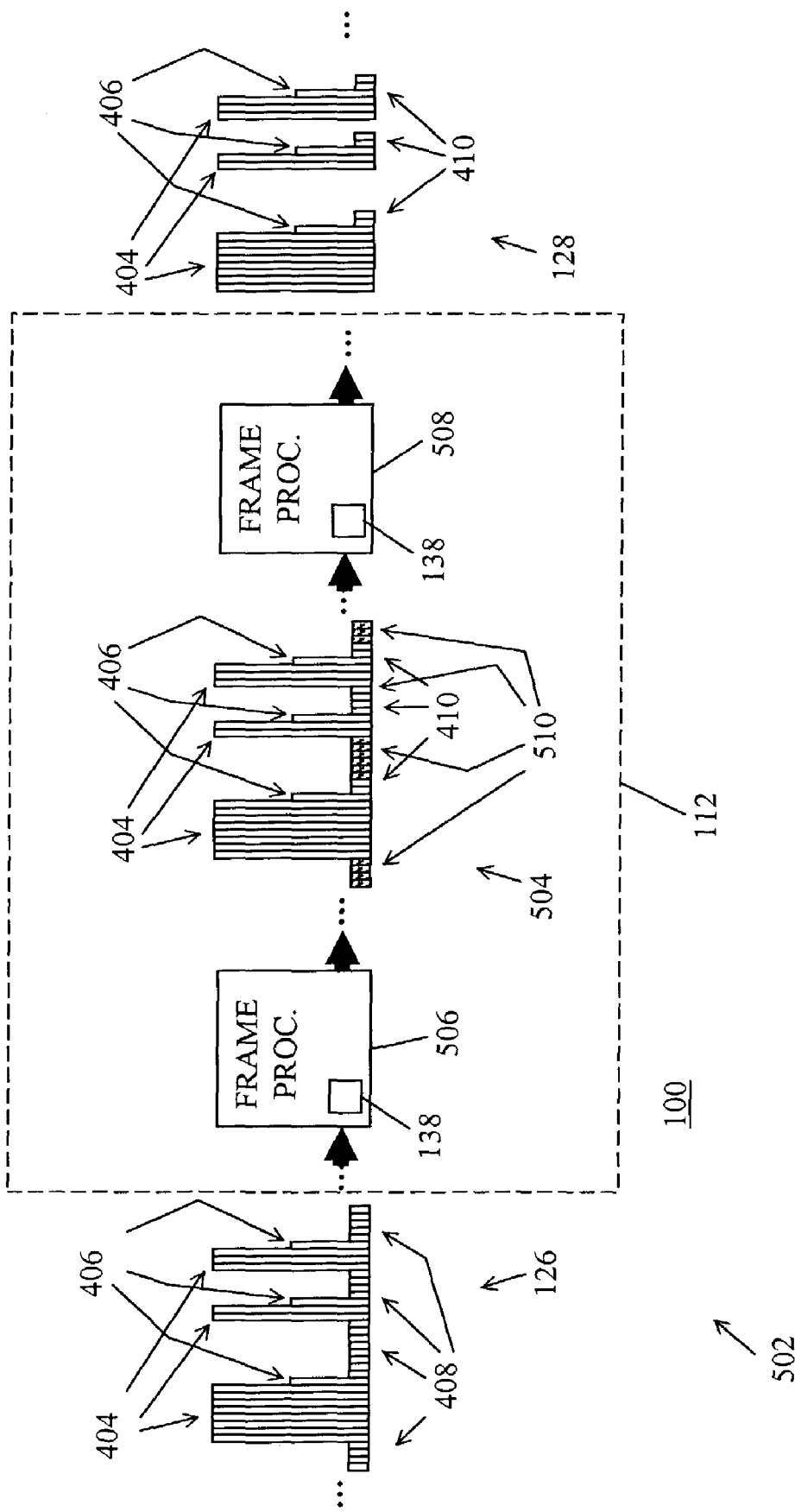
FIG. 5 is a representation of an exemplary data flow through the control component of the apparatus of FIG. 1.

Turning to FIG. 5, a data flow 502 of a call through the control component 112 in one example comprises the first isochronous telecommunication stream of encoded frames 126, a stream of substituted frames 504, and the first non-isochronous telecommunication stream of encoded frames 128. The control component 112 in one example comprises the first frame processor 506 and the second frame processor 508. The first frame processor 506 in one example comprises an instance of a recordable data storage medium 138, as described herein. The second frame processor 508 in one example comprises an instance of a recordable data storage medium 138, as described herein.

In one example, the mobile cellular communication device 202 comprises the first frame processor 506 and the second frame processor 508. In another example, the mobile cellular communication device 202 comprises the first frame processor 506 and a network infrastructure device of the packet telephony component 102 comprises the second frame processor 508. Exemplary network infrastructure devices of the packet telephony component 102 comprise the media gateways 206 and 208, a base station, a radio network controller, a packet data serving node, and a general packet radio service gateway support node.

The first frame processor 506 in one example replaces one or more encoded frames of the first isochronous telecommunication stream of encoded frames 126 with one or more blank frames 510 to create a stream of substituted frames 504. The blank frames 510 in one example comprise eighth rate frames that contain no information. The second frame processor 508 in one example removes the blank frames 510 from the stream of substituted frames 504 to create the first non-isochronous telecommunication stream of encoded frames 128.

The apparatus 100 in one example employs one or more computer-readable signal-bearing media. Examples of a computer-readable signal-bearing medium for the apparatus 100 comprise the recordable data storage medium 138 of the control component 112, the recordable data storage medium 138 of the frame generator 118, the recordable data storage medium 138 of the first frame processor 506, and the recordable data storage medium 138 of the second frame processor 508. For example, the computer-readable signal-bearing medium for the apparatus 100 comprises one or more of a magnetic, electrical, optical, biological, and atomic data storage medium. In one example, the computer-readable signal-bearing medium comprises a modulated carrier signal transmitted over a network comprising or coupled with the apparatus 100, for instance, one or more of a telephone network, a local area network ("LAN"), the Internet, and a wireless network.

The steps or operations described herein are just exemplary. There may be many variations to these steps or operations without departing from the spirit of the invention. For instance, the steps may be performed in a differing order, or steps may be added, deleted, or modified.

Although exemplary implementations of the invention have been depicted and described in detail herein, it will be apparent to those skilled in the relevant art that various modifications, additions, substitutions, and the like can be made without departing from the spirit of the invention and these are therefore considered to be within the scope of the invention as defined in the following claims.

We claim:

1. An apparatus, comprising:
a frame generator configured to receive a non-isochronous telecommunication stream;
wherein the non-isochronous telecommunication stream comprises a plurality of encoded frames from a first isochronous telecommunication stream;
wherein the frame generator is configured to add one or more generated frames to the non-isochronous telecommunication stream to create a second isochronous telecommunication stream;
wherein the frame generator adds the one or more generated frames to the non-isochronous telecommunication stream in place of one or more encoded frames that were removed from the first isochronous telecommunication stream based on a code rate of the one or more encoded frames.

2. The apparatus of claim 1, further comprising:
a control component configured to receive the first isochronous telecommunication stream from a variable rate isochronous coder-decoder (codec);
wherein the variable rate isochronous codec encodes the first isochronous telecommunication stream at a plurality of code rates of multiple available code rates;
wherein the control component is configured to remove the one or more encoded frames from the plurality of frames of the isochronous telecommunication stream based on the code rate of the one or more encoded frames to create the non-isochronous telecommunication stream.

3. The apparatus of claim 1, wherein a first decoded audio stream of the first isochronous telecommunication stream is audibly similar to a second decoded audio stream of the second isochronous telecommunication stream.

4. The apparatus of claim 2, wherein the one or more encoded frames comprise a first number of encoded frames, wherein the one or more generated frames comprise a second number of generated frames;
wherein the first number and the second number are equal;
wherein the frame generator adds the one or more generated frames to the non-isochronous telecommunication stream in place of the one or more encoded frames that the control component removed from the first isochronous telecommunication stream.

5. The apparatus of claim 2, wherein the control component sends the non-isochronous telecommunication stream to the frame generator through a non-isochronous portion of a telecommunication network.

6. The apparatus of claim 5, wherein the non-isochronous portion of the telecommunication network comprises a real-time protocol/user datagram protocol/internet protocol (RTP/UDP/IP) stack.

7. The apparatus of claim 5, wherein the non-isochronous portion of the telecommunication network comprises an asynchronous transfer mode adaptation layer 2 protocol.

8. The apparatus of claim 1, wherein the one or more generated frames are based on one or more previously received frames.

9. The apparatus of claim 8, wherein the plurality of frames comprise one or more low information content reference frames;
wherein one or more of the generated frames are based on one or more of the low information content reference frames.

10. The apparatus of claim 9, wherein the first isochronous telecommunication stream represents a voice stream, wherein the one or more low information content reference frames represent low volume noise of the voice stream.

11. The apparatus of claim 1, wherein the one or more encoded frames comprise one or more contiguous sets of frames of the plurality of frames.

12. The apparatus of claim 11, wherein the plurality of frames comprise one or more low information content reference frames, wherein the one or more low information content reference frames comprise a low information content reference frame encoded by the variable rate isochronous coder-decoder at one of the code rates of the one or more encoded frames;
wherein the one or more contiguous sets of frames follow the one or more low information content reference frames.

13. The apparatus of claim 1, wherein the code rates of the one or more encoded frames comprise a lowest code rate of the plurality of code rates.

14. The apparatus of claim 13, wherein the plurality of code rates comprise a full rate code rate, a half rate code rate, a quarter rate code rate, and an eighth rate code rate;
wherein the lowest code rate of the plurality of code rates comprise the eighth rate code rate.

15. The apparatus of claim 2, wherein the variable rate isochronous coder-decoder comprises an isochronous code division multiple access (CDMA) coder-decoder.

16. The apparatus of claim 15, wherein the isochronous code division multiple access coder-decoder comprises one of an enhanced variable rate codec (EVRC), a 13 kilobit version (13 k), and a selectable mode vocoder (SMV).

17. The apparatus of claim 2, wherein the first isochronous telecommunication stream represents a voice stream, wherein the one or more encoded frames represent low volume noise of the voice stream.

18. The apparatus of claim 17, wherein the control component removes the one or more encoded frames that represent low volume noise of the voice stream to increase a transport efficiency of the isochronous telecommunication stream.

19. The apparatus of claim 1, wherein the first isochronous telecommunication stream of encoded frames represents a voice stream from a user of a first mobile cellular communication device to a user of a second mobile cellular communication device.

20. The apparatus of claim 1, wherein the first isochronous telecommunication stream of encoded frames represents a voice stream from a user of a mobile cellular communication device to a user of a landline communication device.

21. The apparatus of claim 1, wherein the first isochronous telecommunication stream of encoded frames represents a voice stream from a user of a landline communication device to a user of a mobile cellular communication device.

22. A method for processing a first isochronous telecommunication stream that comprises a plurality of frames encoded by a variable rate isocbronous coder-decoder at a plurality of code rates of a multiple of available code rates, the method comprising the step of:
removing one or more encoded frames from the plurality of frames of the first isochronous telecommunication stream based on code rates of the one or more encoded frames to create a non-isochronous telecommunication stream;
sending the non-isochronous telecommunication stream through a portion of a non-isochronous telecommunication network to a frame generator;
adding, by the frame generator, one or more generated frames to the non-isochronous telecommunication stream to create a second isochronous telecommunication stream.

23. An article configured to process an isochronous telecommunication stream that comprises a plurality of frames encoded by a variable rate isochronous coder-decoder at a plurality of code rates of a multiple of available code rates, the article comprising:
- one or more computer-readable signal-bearing media; and
- means in the one or more media for removing one or more encoded frames from the plurality of frames of the isochronous telecommunication stream based on a code rate of the one or more encoded frames to create a non-isochronous telecommunication stream; and
- means in the one or more media for sending the non-isochronous telecommunication stream through a portion of a non-isochronous telecommunication network to a frame generator;
- means in the one or more media for adding one or more generated frames to the non-isochronous telecommunication stream to create a second isochronous telecommunication stream.

* * * * *